(No Model.) 6 Sheets—Sheet 2.

G. S. DUNCAN.
HYDRAULIC MACHINERY.

No. 478,225. Patented July 5, 1892.

Fig. 2.

WITNESSES:
E. B. Bolton
H. Kustner

INVENTOR:
George Smith Duncan
By Richards
Attorneys.

(No Model.) 6 Sheets—Sheet 3.

G. S. DUNCAN.
HYDRAULIC MACHINERY.

No. 478,225. Patented July 5, 1892.

*Fig. 3.*

WITNESSES:
E. B. Bolton
H. Kusterer

INVENTOR
George Smith Duncan
BY Richards
ATTORNEYS (No Model.)  6 Sheets—Sheet 4.

G. S. DUNCAN.
HYDRAULIC MACHINERY.

No. 478,225.  Patented July 5, 1892.

Fig. 4.

WITNESSES:
E. B. Bolton
H. Kusterer.

INVENTOR
George Smith Duncan
BY Richards
ATTORNEYS (No Model.) 6 Sheets—Sheet 5.

G. S. DUNCAN.
HYDRAULIC MACHINERY.

No. 478,225. Patented July 5, 1892.

WITNESSES:
E. B. Bolton
H. Kusterer

INVENTOR
George Smith Duncan
BY Richards
ATTORNEYS

(No Model.) 6 Sheets—Sheet 6.

G. S. DUNCAN.
HYDRAULIC MACHINERY.

No. 478,225. Patented July 5, 1892.

WITNESSES:
E. B. Bolton
H. Kusterer

INVENTOR
George Smith Duncan
BY Richards
ATTORNEYS

UNITED STATES PATENT OFFICE.

GEORGE SMITH DUNCAN, OF MELBOURNE, VICTORIA.

HYDRAULIC MACHINERY.

SPECIFICATION forming part of Letters Patent No. 478,225, dated July 5, 1892.

Application filed February 4, 1891. Serial No. 380,154. (No model.)

*To all whom it may concern:*

Be it known that I, GEORGE SMITH DUNCAN, civil engineer, a subject of the Queen of Great Britain, residing at Melbourne Chambers, Little Collins Street, Melbourne, in the British Colony of Victoria, have invented new and useful improved means for automatically governing the power-water used in hydraulic machinery and for automatically returning it either to the main or an accumulator, of which the following is a specification.

This invention relates to almost all classes of hydraulic machinery, and is more especially applicable to lifts and presses which are operated by water under a high pressure. Its object is to reduce the quantity of power-water required for operating hydraulic machinery, and it accomplishes this object partly by automatically regulating the amount of power-water used, according to the load to be raised or work to be done, and partly by automatically returning a certain proportion of water into either the pressure-main or into an accumulator, according to the weight of the descending load.

It consists in the combination, with the main operating-cylinder of a hydraulic machine, of two or more cylinders of varying area (which I shall hereinafter refer to as governing-cylinders) connected one with said main operating-cylinder and the other or others with a multiple valve or valves connected with apparatus such as is hereinafter described, whereby they are automatically opened or closed according to the pressure in said main operating-cylinder, so as to admit the power-water into one or other of said governing-cylinders according to the pressure in said operating-cylinder—that is, according to the weight on the ram or the work to be done.

It likewise consists in the combination, with the two or more different-sized governing-cylinders, which, as above mentioned, are according to this invention connected to the main operating-cylinder of the hydraulic machine, of a multiple valve or valves connected with an apparatus, such as hereinafter described, whereby said valve or valves are automatically operated by the pressure in said main operating-cylinder, so as to open communication between said governing-cylinders and either the hydraulic main or an accumulator or accumulators, in order that a certain proportion of water may be returned from one or more of said governing-cylinders either into the main or into said accumulator, according to the pressure in the main operating-cylinder—that is, according to the weight of the descending load.

Having now briefly described and ascertained the main features of my invention, I will proceed to describe the same more particularly, reference being had to the accompanying drawings, wherein—

Fig. 6 is a vertical section of said mechanism on line 6 6, Fig. 5, while Fig. 9$^a$ is a similar view of another form of the same part, showing its construction when required to open the valve connected with it more than once in the one operation. Fig. 14 is a detached view of part of my invention, illustrating the application thereto of a contrivance for automatically opening one or more of the governing-valves in the event of the weight of the cage being rendered inoperative by reason of its being supported upon the floor of the lift-well, while

Similar letters of reference indicate the same or corresponding parts in all the figures.

A represents the main ram-cylinder of the lift, and A' the ram working therein, while B represents a cylinder connected with said ram-cylinder A and of sufficient capacity to contain enough oil or water to entirely fill the said ram-cylinder. Inside this cylinder B works a piston $b$, formed with an upwardly-projecting plunger $b'$, fitted at its upper end with a smaller piston $c$, working inside a second cylinder C. This said smaller piston $c$ is likewise provided with an upwardly-projecting plunger $d$, which projects up into the smallest cylinder D of the series. Stuffing-boxes $b^2$ $c'$ $d'$ are provided for the plungers $b$ $c$ $d$ to work through. The upper ends of the cylinders B C D are each connected by a separate pipe $e^*$ $f^*$ $g^*$ with a stop-valve E F G, as clearly illustrated.

The different areas of the pistons $b$ $c$ and ram $d$ may be varied to any desired extent. For instance, with a pressure of, say, seven hundred pounds to the square inch of power-water I may so construct them as that they automatically give a choice of, say, either two hundred and fifty pounds, three hundred and fifty pounds, four hundred and fifty pounds, five hundred and fifty pounds, six hundred and fifty pounds, or eight hundred pounds pressure to the square inch on the lift-ram, it being obvious that, if desired, one or more of said valves E F G can be opened at the same time, so as to put a corresponding number of said cylinders in communication with the power-water supply.

Figure 5:
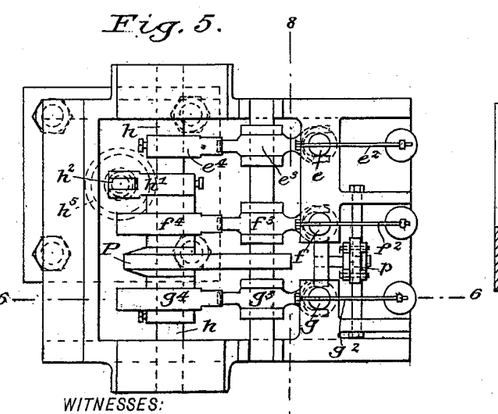
Fig. 5 is a plan illustrating the construction of the mechanism which I employ for operating the different valves in order to allow the pressure-water to flow into the various-sized cylinders, according to the power required.
Figure 6:
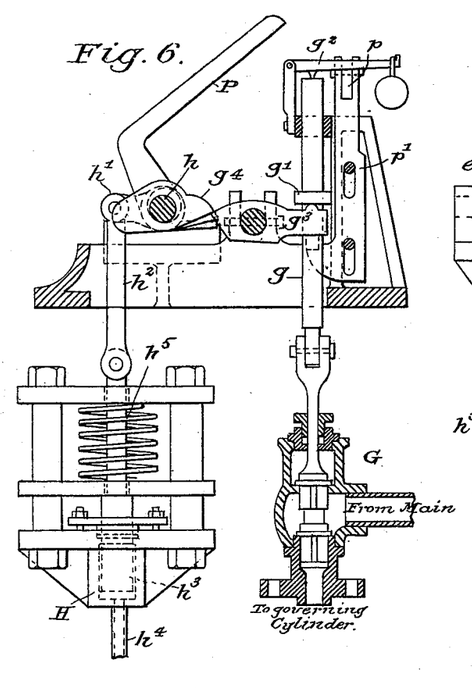
Figure 7:
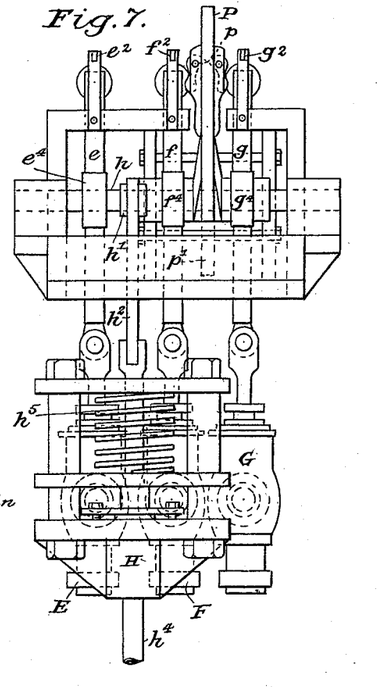
Fig. 7 is a front elevation thereof.

The spindles $e$ $f$ $g$ of the valves E F G extend upwardly through stuffing-boxes in the casings of said valves and are formed each with a collar $e'$ $f'$ $g'$ near the upper ends, and they may be weighted; or, if preferred, a weighted arm $e^2$ $f^2$ $g^2$, Figs. 5, 6, and 7, may be arranged to bear upon their upper ends with any force required to keep the valves normally closed. Small pivoted trip-levers $e^3$ $f^3$ $g^3$ project underneath and engage each with one of the collars $e'$ $f'$ $g'$ on the valve-spindles $e$ $f$ $g$, while with each of said pivoted trip-levers engages one of a series of pawls, cams, or catches $e^4$ $f^4$ $g^4$, which are mounted upon a rock-shaft $h$. The engaging surface of these cams, pawls, or catches $e^4$ $f^4$ $g^4$ are made of a greater or less incline, respectively—as, for instance, the engaging surface of $e^4$ may be made horizontal, that of $f^4$ of a slight incline, and of $g^4$ of a still greater incline. Thus it will be seen that upon the rocking of shaft $h$ the cam whose engaging surface is nearest the trip-lever will accordingly open its attached valve first and the rest will operate in their turn. Upon this latter is a short crank-arm $h'$, connected by a rod $h^2$ with a piston or plunger $h^3$, working in a small cylinder H. This cylinder is in communication through a small pipe $h^4$ with the interior of either the cylinder B or the cylinder A, it being obviously immaterial which, because both of said cylinders are, as above mentioned, in open communication one with the other, and therefore the pressure in the one is always the same as in the other. The pressure of water in the cylinder B or main operating-cylinder A tends to force the plunger or piston $h^3$ up against the resistance of a spring $h^5$, whose pressure can be regulated at will, in order to determine the pressure required for opening the valves E F G. I represents the power-water-supply main or a pipe leading therefrom, and J the exhaust-pipe leading into an overhead tank or other storage-reservoir K. This power-water main I and exhaust-pipe J are each fitted with a stop-valve $i$ $j$, connected together by some suitable contrivance which will insure their working alternately, so that when one is opened the other will be shut. Said valves may be operated by a rod, chain, or rope passing through the cage of the lift, and therefore under the control of the attendant, in the ordinary manner.

In order that a certain amount of water proportionate to the load may be either returned to the power-water main or else be forced into an accumulator, the cylinders B C D are connected with the valves L M N, whose spindles are operated by an apparatus which is similar to that to which the spindles of the valves E F G are connected. By this means said valves may be automatically closed, according to the pressure of water contained in the operating-cylinder O, whose functions and construction are similar to that of the cylinder H, above described. This cylinder O is in open communication with the lower part of the cylinder B by pipe $o^4$, corresponding to the pipe $h^4$.

Figure 1:
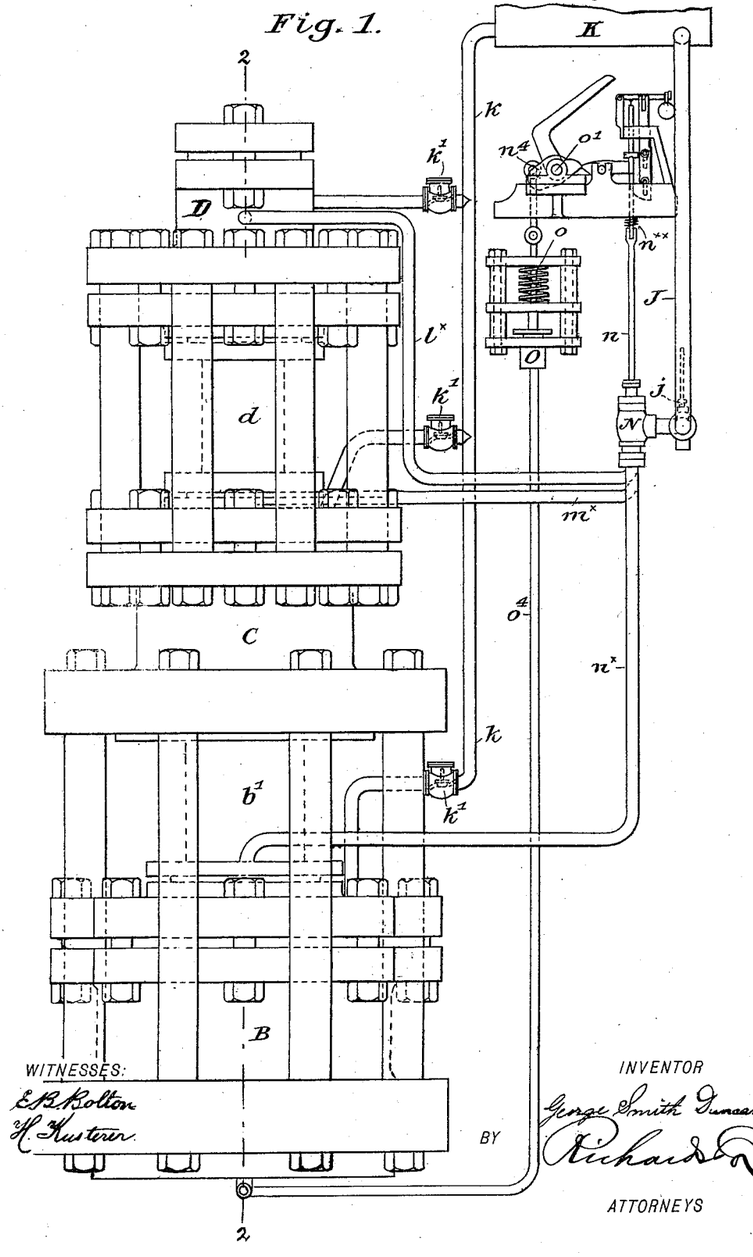
Figure 1 is a side elevation of a complete set of my improved means for automatically regulating the amount of power-water used in hydraulic machinery, according to the weight to be raised or work done, and for automatically returning a certain proportion of water either to the main or else into an accumulator, according to the weight of the descending load.
Figure 9:
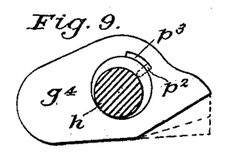
Fig. 9 is a detached side elevation of one of the parts of said mechanism.

The operation of my invention is as follows: Assuming, for instance, that it is required to raise the cage of the lift with the attendant in it, or with, perhaps, the attendant and only one light passenger, then I employ the small governing-cylinder D—that is, the strength of the spring $h^5$ is so proportioned that the plunger or piston $h^3$ will be raised sufficiently by the pressure of water in the cylinders A and B to cause it to turn the rock-shaft $h$ enough to cause the pawl or cam $g^4$ to open the valve G through the medium of the small rocking lever $g^3$ and collar $g'$, the effect being to open communication between the pressure-main I and the cylinder D as soon as the stop-valve $i$ is opened by the lift-attendant in the ordinary manner. The power-water will then be free to flow from the power-main I through the valve G along the pipe $g^*$ into said cylinder D, when it will force down the ram $d$ and pistons $c$ $b$, and will thereby force the water or oil out of the cylinder B into the ram-cylinder A, and thus lift the cage. Meanwhile the cylinder C and the upper part of the cylinder B will fill up with slack water from the tank K through the pipe $k$, which is provided with retention-valve $k'$, as illustrated in Fig. 1, in order to prevent the water from being forced back along said pipe. The operating catches or cams $e^4 f^4 g^4$ may be so arranged upon the rock-shaft $h$ that should the pressure in the cylinders A and B be increased by more passengers or other extra weight getting into or being placed in the lift the valve F, leading into the governing-cylinder C, will be opened, the valve G being then closed, and the pressure of water thus being caused to act upon the piston $c$, whose area, being greater than that of the ram $d$, will enable the increased load to be raised. It will be obvious that the cams or catches $e^4 f^4 g^4$ may be combined and arranged in many different ways. For instance, I may, through their instrumentality, first open communication to the small governing-cylinder D, then with the next largest governing-cylinder C, then with the upper part of the next largest B, after which I may cut off communication with the upper part of said governing-cylinder B and open communication to both of the governing-cylinders C and D at the same time, (a cam or pawl $g^*$, such as is illustrated in Fig. 9$^a$, being employed to reopen the valve G,) after which I might substitute the upper part of B for C, and finally I might so arrange said pawls or cams as that all three cylinders B, C, and D would be in operation together, in which case, if their collective areas were sufficiently large, I might intensify the water in the cylinders A and B to a greater pressure than that of the power-water. When the lift is coming down with a fairly heavy load, the medium-sized piston $c$ may be arranged to force water back into the pressure-main. In order to effect this, the pressure of water in the cylinder B has to raise the piston or plunger in the cylinder O to compress the spring $o$ and turn the rock-shaft $o'$ round sufficiently far to close the valve M through the medium of the cam or catch $m^4$, which is mounted upon said shaft, and is constructed in a similar manner to the cams $e^4 f^4 g^4$ above described. The effect of this will be that the water contained in the cylinder C will be forced to pass through the retention or back-pressure valve $f^6$ into the power-main I, that being obviously the only course open to it. The water from the governing-cylinders B and D will be free to pass through the valves L N and up the discharge-pipe J into the tank or reservoir K. In a similar manner, should a lighter load be coming down in the lift, the valve L will be closed, and the water in the governing-cylinder D will be forced along the pipe $g^*$ and through the retention or back-pressure valve $g^6$ into the main; or, if a larger load be descending in the cage, the valve N will be closed and the water in the upper part of the cylinder B will be forced to pass through the pipe $e^*$ and back-pressure valve $e^6$ into said main I; or, under some circumstances, any two or even all of the governing-cylinders B C D might be coupled together and be caused to force water back into the main cams, such as are illustrated in Fig. 9$^a$, being employed to open two of the valves a second time. It will be obvious that the amount of this returned water will be regulated by the areas of the pistons $b$ and $c$ and ram $d$ and that the question of which one of the three is operating will be determined by the pressure in the cylinder B acting upon the piston or plunger in the cylinder O, as above described.

In order to allow two of the cylinders B C D to discharge into the main while the third cylinder discharges into the waste-water tank K, small back-pressure or retention valves $e^7 f^7 g^7$ are inserted in the pipes $e^* f^* g^*$ close to the stop-valves E F G, thus preventing the water from being simply forced out of one of the cylinders B C D into another one, and thence into the waste-water tank K, instead of passing into the main I.

Figure 8:
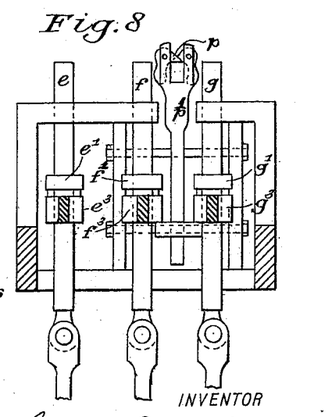
Fig. 8 is a vertical section on line 8 8, Fig. 5.
Figure 10:
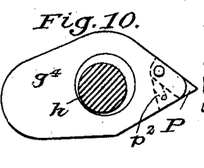
Fig. 10 is a similar view of the same detail, but illustrating a modification thereof.
Figure 11:
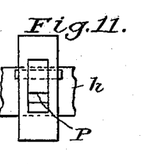
Fig. 11 is an end elevation thereof.
Figures 12, 15:
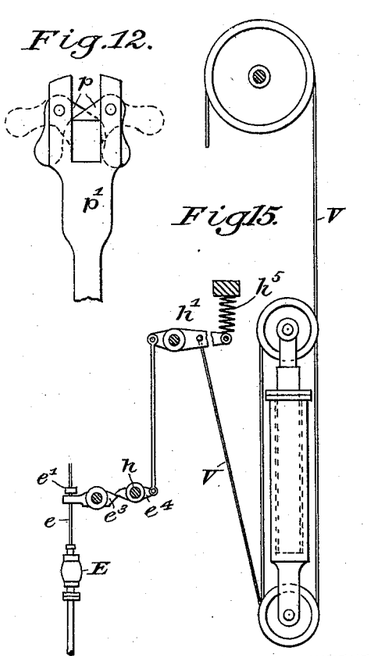
Fig. 12 is a side elevation of yet another detail.
Fig. 15 is a diagrammatic view of another application of my invention, illustrating it as operated by the pull of the haulage-rope.

In order to allow either of the two valves F G to be opened and afterward returned to their normal positions, while at the same time allowing the valve E to be opened, I either construct the two pawls or cams $f^4 g^4$ as illustrated in Figs. 10 and 11, or else I secure an arm P upon the rock-shaft $h$, and adapt said arm to engage with a pair of pawls or catches $p$ $p$, (Figs. 8 and 12) on a vertically-sliding frame $p'$, adapted to raise the ends of the pivoted trip-levers $f^3 g^3$, so as to allow the cams or catches $f^4 g^4$ to pass them and so return to their normal positions. The pawls $p$ are provided with weighted tail-pieces, whereby they are normally kept projecting into the center of said frame, as clearly illustrated in full lines in Figs. 8 and 12. The bent arm or lever P and the pawls $p$ are so arranged that just when the valve F is fully opened said arm will engage with said pawls $p$ $p$, so that in the event of the passengers getting off the lift said arm will raise the sliding frame $p'$ and will carry with it the ends of either one or both of the trip-levers $f^3 g^3$, thus depressing the other ends of said trip-levers, and thereby allowing the pawls or cams $f^4 g^4$ to pass them and return to their normal positions, said pawls or cams being each secured upon the shaft $h$ by a pin $p^2$, (*vide* Fig. 9,) working in a slot $p^3$, cut in said pawl, and so arranged as to allow the shaft $h$ a certain amount of rotation before it carries said pawl or cam with it, thereby allowing the ends of the trip-levers $f^3 g^3$ to be lowered sufficiently far to allow said pawls or catches $f^4 g^4$ to pass them and return to their normal positions. If preferred, instead of this contrivance the end of each of the pawls or catches $f^4 g^4$ might be provided with a small pivoted nose-piece P, (see Figs. 10 and 11,) normally pressed outward by a small spring $p^2$ in such a manner as that it will engage with the trip-levers $f^3 g^3$ on its downward movement, but will be free to pass them on its upward movement. A similar arrangement to one or other of those just described is provided on the opposite side of the machine for use in connection with the operating-gear of the valves L M N. If preferred, suitably-shaped cams might be mounted upon the shaft $o'$ and be arranged to effect the desired object of closing the valves L M N by allowing them to be operated upon by springs $l^{} m^{} n^{**}$, whose tendency is to always keep them closed, or said cams might be constructed to "give" somewhat when reclosing said valves, as will be well understood by all persons skilled in the art to which this invention relates.

Figure 2:
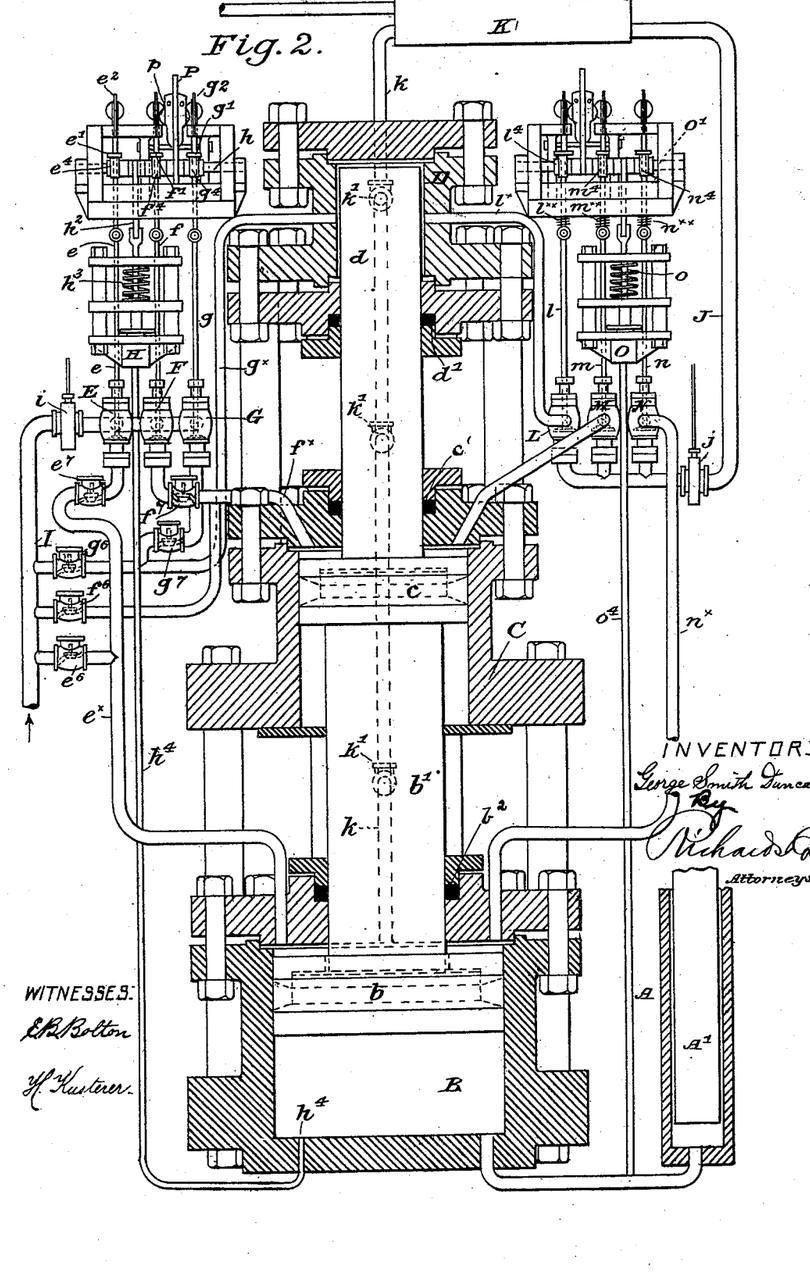
Fig. 2 is a vertical transverse section on line 2 2, Fig. 1.
Figure 3:
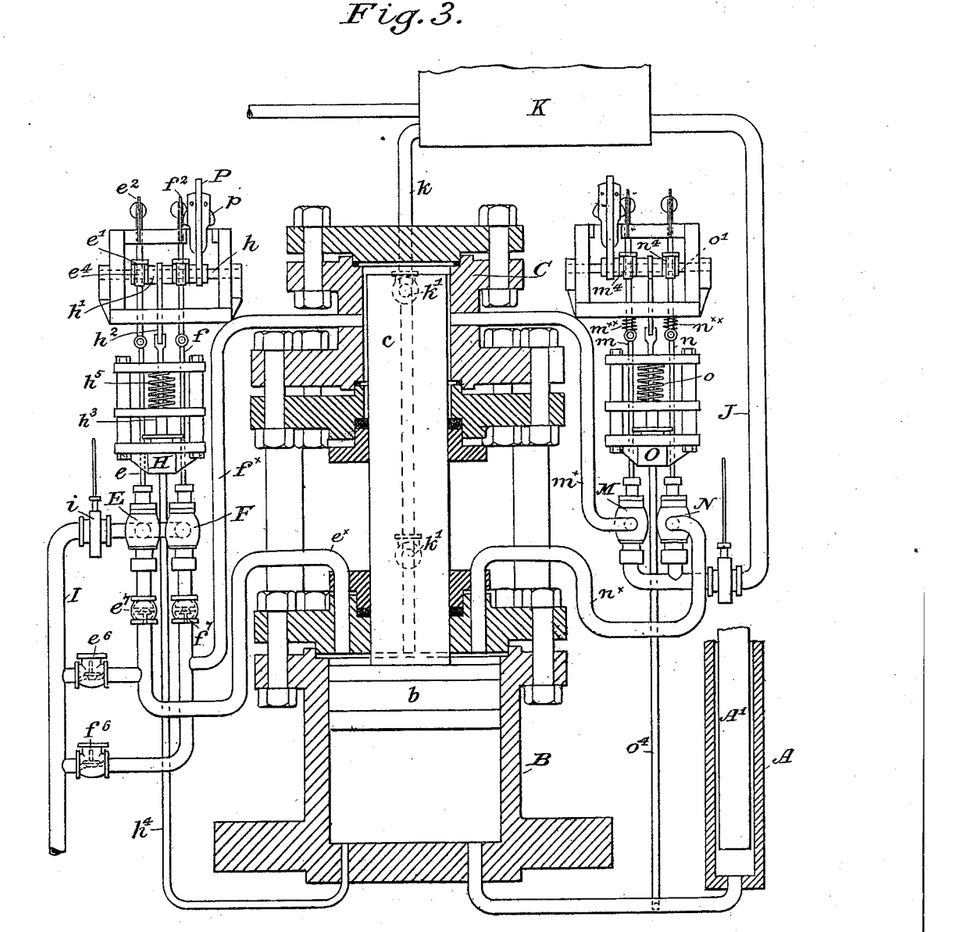
Fig. 3 is a similar view to Fig. 2, but illustrating a simpler form of my invention, such as I prefer to employ in connection with comparatively low-pressure lifts.
Figure 13:
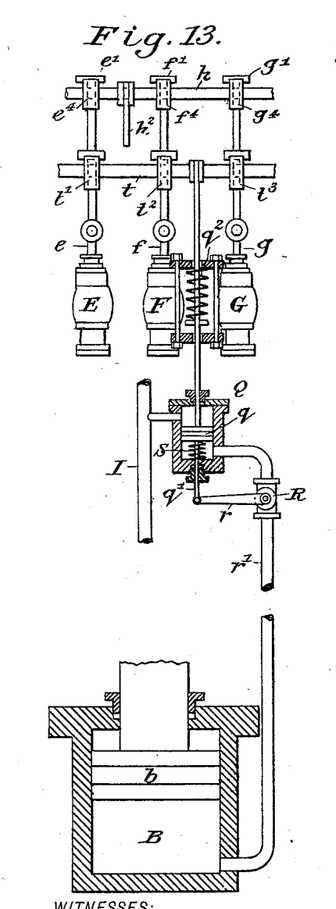
Fig. 13 is a diagrammatic view of an apparatus which has been devised for the purpose of compensating for any reduction in the pressure of the power-water.

To provide against the result of the reduction of the pressure-water below its standard or normal value, I have devised the apparatus illustrated in Fig. 13, in order that an auxiliary governing-cylinder may be brought into operation to, as it were, assist the others, and so provide sufficient power to lift the load with such reduced pressure-water. This apparatus consists of a cylinder Q in open communication with the pressure-main I and fitted with a piston $q$, having a downwardly-projecting spindle $q'$, connected at its lower end with the arm $r$ of a small stop-valve R, inserted in a pipe $r'$, connecting the cylinder Q with the lower end of the cylinder B, and therefore with the main operating cylinder of the lift or other hydraulic machine. Around the spindle $q'$ is arranged a coiled spring S, whose tendency is to always raise said spindle and the piston $q$ against the pressure of water from the main I. This said spring is so adjusted as to be able to force the piston $q$ upward in the event of the pressure in the main I falling below its normal value, the effect being to open the valve R and so admit the water from the lower part of the cylinder B to the under side of the piston $q$, which will then be forced upwardly against the pressure of a second adjustable spring $q^2$, according to the varying pressure in the lower part of the cylinder B—that is, according to the weight of the load to be raised or other work done. This movement of the piston $q$ is utilized for the purpose of turning on one or other of the valves E F G, in addition to the one or ones already opened by the instrumentality of the cylinder H, rock-shaft $h$, and cams or pawls $e^4 f^4 g^4$, a second rock-shaft $t$ being mounted below the first one $h$ and being provided with cams or pawls $t' t^2 t^3$, adapted to raise one or other of the spindles $e f g$ of the valves E F G, it being understood that said cams or pawls $t' t^2 t^3$ are so adjusted as to only operate upon a valve not already opened. By this means, should the pressure in the main fall below its normal value, an extra governing-cylinder B, C, or D will be utilized to, as it were, assist those already in use, and thus the decrease of pressure will be compensated for. The arrangement illustrated in Fig. 3 is similar in its essential features to that described with reference to Figs. 1 and 2, but is simpler, owing to the fact that only two cylinders (B and C) are employed. This modification is suitable for low-pressure lifts where it is only required to have a choice of, say, three powers, it being obvious that the pawls or cams $e^4 f^4$ might in the arrangement illustrated be so arranged as to turn the power-water into the small governing-cylinder C in the event of only a light load being in the cage, or into the governing-cylinder B in the event of there being a heavier load, or into both in the event of its being required to employ the maximum power available. On the downstroke one or other of the governing-cylinders B C would be automatically put in communication with the power-main by the variation of pressure in the lower part of the cylinder B acting upon a rock-shaft $o'$. This arrangement being, as above stated, merely a simplification of that already described with reference to Figs. 1 and 2 will not need any further explanation.

Figure 4:
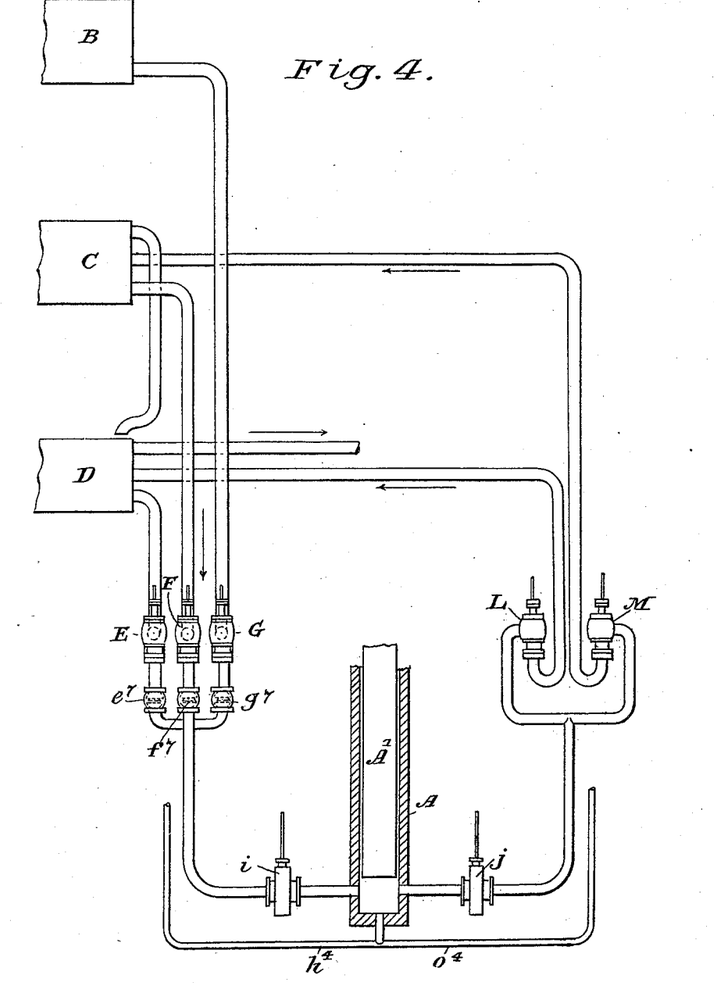
Fig. 4 illustrates a modification of my invention which is adapted for use where the lift is operated by water stored in tanks at various altitudes.

Fig. 4 shows the application of my invention to a lift operated by water contained in three cisterns supported at varying altitudes. Each of said cisterns B C D is connected with one of three valves E F G, which are all connected with the main lift-cylinder A and are operated by mechanism such as is illustrated in Figs. 6 to 12, so that, as hereinbefore mentioned, either of the valves E, F, or G will be opened, according to the power required to raise the load on the ram A', such opening being effected by the pressure of water in the lift-cylinder A acting upon the piston or plunger $h^3$ in the manner above described with reference to the corresponding valves in Fig. 2. Water will be returned into one or other of the cisterns D C, according to the pressure in the cylinder A, by opening one or other of the valves L or M by means of an apparatus constructed as above described and arranged to be operated by the pressure in said cylinder. The operation of this modification of my invention is as follows: Assuming that only a light load is to be raised by the ram A', then the pressure of water caused by said load in the cylinder A will turn on the valve E, so as to utilize the water in the lowest tank D. On the other hand, should the lift be loaded to somewhere near its maximum carrying capacity, the valve G will open, and thus the head of water in the highest tank B will be used. Upon the ram A' descending the water will (provided the load is heavy enough) be forced from the cylinder A through one or other of the valves L M (according to the pressure in said cylinder) into one or other of the tanks C D, thus obviating the necessity for pumping that amount of water up into said tanks by the expenditure of valuable power.

From the foregoing description it will be obvious that with the aid of my invention I am enabled to effect a considerable saving in the amount of power-water required for working hydraulic lifts or other hydraulic machinery, because, instead of, as heretofore, filling the ram-cylinder with high-pressure water at each stroke, irrespectively of whether a heavy or a light load is to be raised, I merely use sufficient water to accomplish the desired object. Moreover, on the return-stroke or descent I utilize the weight of the descending load to force a certain proportional quantity of water either back into the water-main or else into an accumulator.

Figure 14:
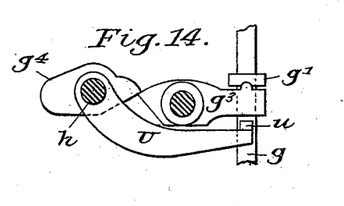

Referring to Fig. 14, U represents an arm which is keyed or otherwise fixed upon the rock-shaft $h$ and whose outer end engages with a lug or stop $u$ upon the spindle of one of the valves E F G. The position of this arm U is so arranged as that in the event of the cage being supported upon the floor of the lift-well, for instance, it will raise said spindle so as to open said valve, and thus allow the pressure-water to flow into one of the governing-cylinders B, C, or D as soon as the starting-valve $i$ is operated in the ordinary way, it being of course understood that as soon as the lift is started the piston $h^3$ in the cylinder H comes into operation and regulates the supply of water into said governing-cylinders, as above described.

The operation depends simply upon the adjustment of the arm U, plunger $h^3$ in the cylinder H, and the strength of the spring $h^5$. When the cage rests on the floor of the well, there is no longer any pressure exerted in the cylinder H, and therefore the spring $h^5$ can force the plunger $h^3$ down into said cylinder far enough to turn the shaft $h$ sufficiently to cause the arm U on it to raise the valve, to whose spindle it is connected. The lift can then be started in the ordinary way by operating the starting-valve, and when once started the pressure in the main ram-cylinder will cause the necessary valve to be opened, so as to direct the power-water into one or other of the operating-cylinders.

Instead of employing the variable pressure of water in the main operating-cylinder A of the hydraulic machine, I may, if preferred, connect the end of the haulage or lifting rope V to a lever $h'$, fulcrumed upon a suitable support and connected at one end with an adjustable spring $h^5$ and at the other end with a rock-shaft $h$, fitted with cams, such as are illustrated at $e^4 f^4 g^4$, whereby the valves E F G may be opened or closed, according to the weight in the cage, in a similar manner to when said rock-shaft $h$ is operated by said variable pressure of water in the main operating-cylinder. The operation of this modification of my invention will be readily understood on reference to Fig. 15, it being obvious that any increase or decrease of weight in the lift will pull down the end of the rope V and will extend the spring $h^5$, and so rock the shaft $h$ a certain amount, thus bringing one or other of said cams or pawls $e^4 f^4 g^4$ into operation.

Having now particularly described and ascertained the nature of my said invention and in what manner the same is to be performed, I declare that what I claim is—

1. The combination, with the main operating-cylinder of a hydraulic machine, of a plurality of governing-cylinders, such as B C, whose pistons are of different areas, connected one with said main cylinder and the rest with valves, such as E F G, and means for automatically opening and closing the same according to the pressure in said main operating-cylinder, substantially as and for the purposes herein described and explained, and as illustrated in my drawings.

2. In a hydraulic machine, the combination, with the main operating-cylinder, of a plurality of governing-cylinders having pistons of different areas, a corresponding number of valves connected with said governing-cylinders, and means for automatically operating the said valves, substantially as set forth.

3. The combination, with the main cylinder, a plurality of governing-cylinders provided with pistons of different areas, one of said cylinders being connected to said main cylinder and valves connected therewith, of a rock-shaft, pawls, or analogous devices fitted thereon, each adapted to open one of said valves, and a piston or plunger connected to said rock-shaft, substantially as and for the purpose set forth.

4. In apparatus for automatically regulating the amount of power-water used in hydraulic machinery according to the weight to be raised or work done, the combination, with the main cylinder and a plurality of governing-cylinders fitted with pistons of different areas and connected each with a separate valve, one of said governing-cylinders being connected directly to the main cylinder, of a rock-shaft, such as $h$, and pawls or catches, such as $e^4 f^4 g^4$, fitted thereon and adapted to engage with trip-levers, such as $e^3 f^3 g^3$, connected with the spindles of said valves, said pawls, catches, or cams being arranged in different relative positions around said shaft, so as to operate upon the spindles of and so open said valves in rotation, and means for returning said shaft to its normal position, substantially as and for the purposes herein described.

5. In an apparatus for automatically regulating the amount of power-water used in hydraulic machinery according to the weight to be raised or work done, the combination, with the spindles, such as $f g$, of a pair of valves, such as F G, an arm or lever, such as P, mounted upon a rock-shaft, such as $h$, carrying pawls, catches, or cams, whereby said spindles may be raised to open said valves, together with a vertically-sliding frame, such as $p'$, engaging with said spindles and fitted with a pair of pawls, such as $p$, wherewith said arm can engage, substantially as and for the purposes herein described and explained, and as illustrated in my drawings.

6. In apparatus for use in hydraulic machinery for automatically returning a certain proportion of water to the water-supply, the combination, with a plurality of cylinders containing pistons or rams of varying areas and connected to said water-supply by pipes fitted with back-pressure or retention valves, of a corresponding number of stop-valves, and means whereby one of said valves will be automatically closed according to the pressure in the main operating-cylinder, substantially as set forth.

7. In an apparatus for regulating the amount of water used in hydraulic machinery, the combination of a main operating-cylinder, a pressure-main, a cylinder communicating therewith and with the main operating-cylinder, a piston in said cylinder, a spring acting on said piston, a valve R, a spindle on said piston, a shaft connected thereto, and spring $q^2$ on said spindle adapted to actuate said shaft, and valves E F G, substantially as and for the purposes specified.

8. In apparatus of the class herein described, the combination, with a power-main, of a main cylinder and a series of governing-cylinders, one of said cylinders connected to said main cylinder, and a series of valves serving to open communication between said power-main and governing-cylinders, and a piston controlled by water-pressure and connected by suitable means to the said valves, substantially as set forth and described.

9. In an apparatus for automatically regulating the amount of power-water used in hydraulic machinery according to the weight to be raised, the combination, with valves E F G, a rock-shaft, and devices thereon for the purpose specified, of an arm $p'$, having pawls $p$, said arm engaging by means of a cross-head on spindles one or more of said valves, the arm P upon said rock-shaft adapted to engage said pawls upon said arm to open one or more of said valves, substantially as described.

GEORGE SMITH DUNCAN.

Witnesses:
WALTER SMYTHE BAYSTON,
EDWIN WILSON.